United States Patent
Grabowska

(10) Patent No.: US 10,626,788 B2
(45) Date of Patent: Apr. 21, 2020

(54) METHODS AND STRUCTURE FOR REDUCING LOSSES IN 90 DEGREE WASTE GATES FOR TURBOCHARGERS

(71) Applicant: BorgWarner Inc., Auburn Hills, MI (US)

(72) Inventor: David G. Grabowska, Asheville, NC (US)

(73) Assignee: BorgWarner Inc., Auburn Hills, MI (US)

(*) Notice: Subject to any disclaimer, the term of this patent is extended or adjusted under 35 U.S.C. 154(b) by 268 days.

(21) Appl. No.: 14/653,463

(22) PCT Filed: Dec. 2, 2013

(86) PCT No.: PCT/US2013/072579
§ 371 (c)(1),
(2) Date: Jun. 18, 2015

(87) PCT Pub. No.: WO2014/099328
PCT Pub. Date: Jun. 26, 2014

(65) Prior Publication Data
US 2015/0345375 A1 Dec. 3, 2015

Related U.S. Application Data

(60) Provisional application No. 61/739,229, filed on Dec. 19, 2012.

(51) Int. Cl.
*F16K 1/16* (2006.01)
*F16K 1/18* (2006.01)
(Continued)

(52) U.S. Cl.
CPC ............ *F02B 37/183* (2013.01); *F02B 37/12* (2013.01); *F04D 17/10* (2013.01); *F04D 29/284* (2013.01);
(Continued)

(58) Field of Classification Search
CPC ...... F02B 37/183; F02B 37/12; Y10T 10/144; F16K 1/16; F16K 1/18; F16K 1/20; F16K 1/2014; F16K 1/205; F16K 1/2064
(Continued)

(56) References Cited

U.S. PATENT DOCUMENTS 3,283,772 A * 11/1966 Ensign .................... E03C 1/106
137/107
4,230,150 A * 10/1980 Scaramucci ............ F16K 15/03
137/527
(Continued)

FOREIGN PATENT DOCUMENTS

JP S63200630 U 12/1988
JP 2011179401 9/2011
(Continued)

OTHER PUBLICATIONS

Original and Translation of WO-2012107224-A1, Lueddecke et al., Aug. 16, 2012.*
(Continued)

*Primary Examiner* — Marina A Tietjen
*Assistant Examiner* — Paul J Gray
(74) *Attorney, Agent, or Firm* — BrooksGroup

(57) ABSTRACT

A turbocharger (10) has an improved wastegate valve assembly (45) wherein a port-controlling valve body (44) includes flow formations which serve to reduce exhaust gas flow in non-optimal directions transverse to an optimal flow direction in the direction of a wastegate passage (26). These flow formations serve to optimize or maximize the flow of exhaust gas in the optimal or primary flow direction as the exhaust gas flow turns through a turn angle (47) from an inlet direction (29) to the optimal flow direction.

4 Claims, 5 Drawing Sheets

(51) Int. Cl.
- *F02B 37/12* (2006.01)
- *F02B 37/18* (2006.01)
- *F04D 17/10* (2006.01)
- *F04D 29/42* (2006.01)
- *F04D 29/28* (2006.01)

(52) U.S. Cl.
CPC ............ *F04D 29/4206* (2013.01); *F16K 1/16* (2013.01); *Y02T 10/144* (2013.01)

(58) Field of Classification Search
USPC ............ 137/527, 527.2, 527.4, 527.6, 527.8
See application file for complete search history.

(56) References Cited

U.S. PATENT DOCUMENTS

| | | | | |
|---|---|---|---|---|
| 4,508,139 | A | * | 4/1985 | Teumer ............... F16K 15/033 137/315.13 |
| 5,046,317 | A | | 9/1991 | Satokawa |
| 5,327,933 | A | * | 7/1994 | Ishikawa ............... B60K 15/04 137/527.6 |
| 2002/0078999 | A1 | * | 6/2002 | Sisk ............... F16K 15/033 137/527 |
| 2011/0173974 | A1 | | 7/2011 | Grabowska |
| 2013/0305711 | A1 | * | 11/2013 | Lueddecke ............ F02B 37/186 60/602 |

FOREIGN PATENT DOCUMENTS

| | | |
|---|---|---|
| KR | 1020110060934 A | 6/2011 |
| KR | 101048911 | 7/2011 |
| KR | 1020120014934 A | 2/2012 |
| KR | 1020120017090 | 2/2012 |
| WO | 2012107224 A1 | 8/2012 |

OTHER PUBLICATIONS

Chinese Office Action dated Jul. 24, 2017 ; Application No. 201380064006.9; Applicant: BorgWarner Inc.; 5 pages.
Indian Office Action dated Mar. 26, 2019; Application No. 5590/DELNP/2015; Applicant: BorgWarner Inc.; 9 pages.
Korean Office Action dated Jun. 19, 2019; Application No. 10-2015-7017776; Applicant: BorgWarner Inc.; 13 pages.

* cited by examiner

METHODS AND STRUCTURE FOR REDUCING LOSSES IN 90 DEGREE WASTE GATES FOR TURBOCHARGERS

CROSS-REFERENCE TO RELATED APPLICATION

This application claims priority to and all benefits of U.S. Provisional Application No. 61/739,229 filed on Dec. 19, 2012, and entitled "Methods And Structure For Reducing Losses In 90 Degree Waste Gates For Turbochargers."

FIELD OF THE INVENTION

The invention relates to a turbocharger with an improved waste gate valve and more particularly, to an improved turbine waste gate design which facilitates the flow of exhaust gases in a primary flow direction to improve flow through the turbocharger waste gate.

BACKGROUND OF THE INVENTION

Turbochargers are provided on an engine to deliver air to the engine intake at a greater density than would be possible in a normal aspirated configuration. This allows more fuel to be combusted, thus boosting the engine's horsepower without significantly increasing engine weight.

Generally, turbochargers use the exhaust flow from the engine exhaust manifold, which enters the turbine housing at a turbine inlet, to thereby drive a turbine wheel, which is located in the turbine housing. The turbine wheel is affixed to one end of a shaft, wherein the shaft drives a compressor wheel mounted on the other end of the shaft. As such, the turbine wheel provides rotational power to drive the compressor wheel and thereby drive the compressor of the turbocharger. This compressed air is then provided to the engine intake as referenced above.

In designing the turbine stage, selection of the turbine stage components is made relative to a preferred performance point. In a simple uncontrolled fixed-nozzle turbocharger system, an uncontrolled turbocharger is designed so that optimal performance is reached at high engine speeds. However, at other speeds the turbocharger provides suboptimal boost or air volume to the engine.

Controlled turbochargers provide improved performance, in that the turbine optimal operating point is already reached at low or medium engine speeds. Generally in a controlled system, when the flow rate of exhaust gases increases and the turbocharging pressure becomes too high, part of the exhaust gases are discharged into the surrounding atmosphere through a wastegate so as to bypass the turbine.

Typically, the exhaust gas flows through a volute defined within the turbine housing or casing. Further, a wastegate passage is also provided which is separated from the volute by an intermediate wall. To provide for wastegate flow, a wastegate port is provided in the wall which port is controlled by a wastegate valve.

The wastegate valve is selectively openable and closable during operation of the turbocharger. In one such arrangement, the flow of exhaust gas through the wastegate passage is generally parallel to the direction of flow in the volute, at least in the region of the wastegate passage. Typically, the turbine inlet flow and wastegate flow extend circumferentially in the direction of the volute. However, the wastegate port opens perpendicular to or substantially at a right angle to these flow directions and as such the wastegate flow enters the wastegate passage in a sideward or axial direction and then turns immediately through a right angle so as to flow circumferentially through the wastegate passage. Hence, this configuration may commonly be referenced as a 90 degree wastegate although the actual turn angle may vary from a 90 degree angle to some extent, such that the turn angle between the inlet direction and wastegate flow direction may be an obtuse angle above 90 degrees or an acute angle below 90 degrees.

The invention relates to an improved wastegate valve for a turbocharger which provides more efficient flow of the exhaust gas through the wastegate port and the wastegate passage. More particularly as to the wastegate valve, this valve typically includes a disc-like valve body which is pivotally supported on the turbine housing so as to open and close the wastegate port. The valve body is moved by an actuator and can pivot into the wastegate port to a first position which closes the wastegate port, and pivot out of the wastegate port to a second position which opens the wastegate port. Therefore, a controlled portion of exhaust gas may flow through the wastegate passage which in turn flows to a turbine outlet, thereby bypassing the turbine.

When in the open position, the valve body has a valve face which faces toward the wastegate port and is canted at an angle relative to a plane spanning the wastegate port. The valve face preferably is oriented so that the valve face angles toward the wastegate passage which serves to redirect the wastegate flow as it passes through the port and turns into the wastegate passage.

The direction toward the wastegate passage is the primary direction toward which all of the wastegate flow needs to be directed. However, in known valve bodies of a wastegate valve, the exhaust gas may spill over the sides of the valve body in non-optimal flow directions transverse to the wastegate passage direction which therefore creates turbulent fluid flow in this region and requires that this turbulent flow be further redirected by the sides of the wastegate passage in order to direct the exhaust gas into the wastegate passage. This reduces the efficiency of the flow through the wastegate port and can create increased back pressure and efficiency losses.

However, the valve body of the inventive wastegate valve includes flow formations which serve to reduce the flow of exhaust gas in non-optimal directions. These flow formations serve to optimize or maximize the flow of exhaust gas in the optimal or primary flow direction as the exhaust gas flow turns through the turn angle.

In a first embodiment, the flow formation is defined by a dished valve face which is formed by a concave shape provided to the valve face. This concave shape may be a true concave shape wherein the valve face curves inwardly about the entire periphery of the valve face. The concave shape also may be a modified concave shape wherein the valve face slopes from the leading and trailing edges of the valve face to the center thereof while the sides possibly could have less or no concavity. The term concave will also be understood to apply to an inclined flat surface that does not have any curvature from the periphery to the center of the valve face.

In a second embodiment, the valve face may be provided with shallow ribs or strakes which extend parallel to the flow direction and serve to direct flow in the primary direction.

In a third embodiment, the flow formation may be a dam that rises from the valve face along a portion of the face perimeter. The dam could be on the trailing edge or more preferably, on the leading edge of the valve face.

As described in further detail herein, these flow formations serve to optimize flow in the primary direction and reduce non-optimal flow in secondary directions transverse to the primary direction.

Other objects and purposes of the invention, and variations thereof, will be apparent upon reading the following specification and inspecting the accompanying drawings.

Figure 1:
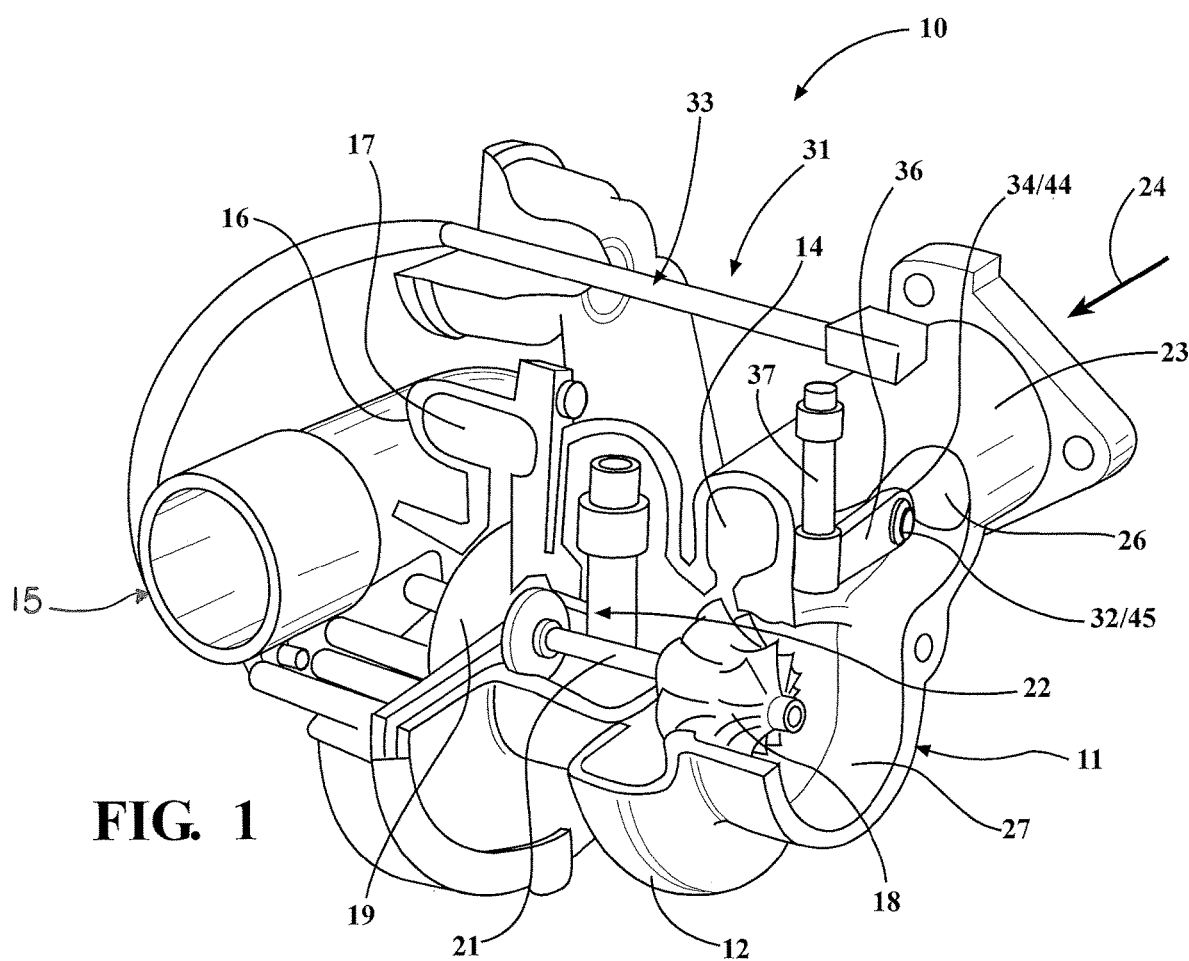
FIG. 1 is a cut-away, pictorial view of a representative turbocharger.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to the cut-away view of FIG. 1, a turbocharger 10 is shown which includes a turbine 11 that defines a turbine housing or casing 12 having a volute 14 extending circumferentially therein. Turbocharger 10 further includes a compressor 15 which is provided in combination with the turbine 11 in a conventional manner. The compressor 15 includes a compressor housing 16 and a compressor volute 17.

The turbocharger 10 has the basic combination of the turbine 11 and the compressor 15 which respectively include a turbine wheel 18 and a compressor wheel 19 that are rotatably connected by a shaft 21. In turn the shaft 21 is supported by a bearing system 22.

Figure 3:
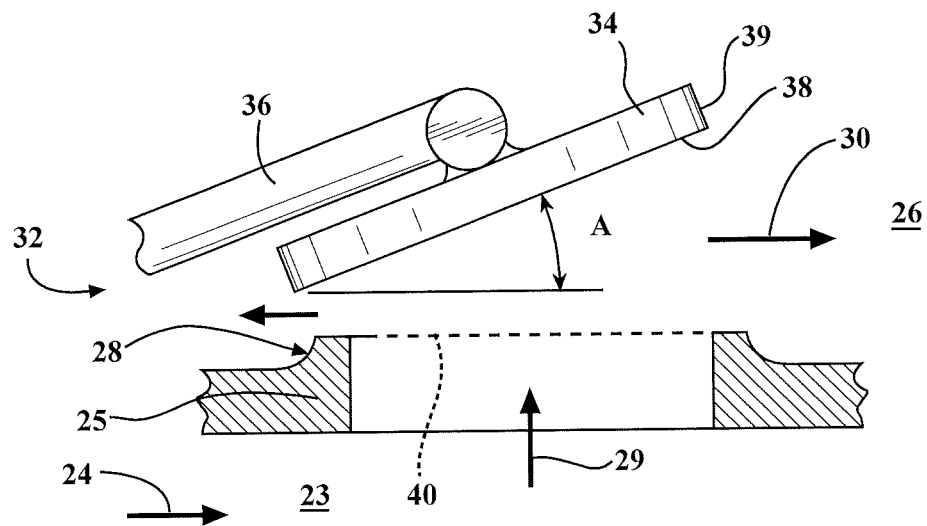
FIG. 3 is a side view of the wastegate valve.

As seen in FIGS. 1 and 3, the turbine 11 is supplied with exhaust gas through the turbine inlet 23. The turbine inlet 23 defines a flow direction 24 which extends circumferentially into the turbine volute 14. The volute 14 further has an intermediate wall 25, shown in FIG. 3, which divides the volute 14 from a wastegate passage 26 which also extends circumferentially and discharges into the turbine outlet 27.

To divert a portion of the exhaust gas flow from the turbine inlet 23 during operation of the turbocharger 10, the wall 25 includes a wastegate port 28 which defines a flow direction 29 that is transverse to the direction of inlet flow 24. This flow direction 29 is also transverse to the primary flow direction 30 extending through the wastegate passage 26.

The flow of exhaust gas flows from the inlet 23 to both the volute 14 and the wastegate passage 26 wherein the flow directions 24 and 30 are generally parallel to each other, at least in the region of the wastegate port 28. The wastegate port 28 opens in direction 29 which is perpendicular to or substantially at a right angle to these flow directions 24 and 30. As such, the wastegate flow enters the wastegate passage 26 in a sideward or axial direction 29 and then turns immediately through a right angle so as to flow circumferentially in the primary flow direction 30 through the wastegate passage 26. Hence, this may commonly be referenced as a 90 degree wastegate although the actual turn angle may vary from a 90 degree angle to some extent, such that the turn angle between the inlet direction and wastegate flow direction may be an obtuse angle above 90 degrees or an acute angle below 90 degrees.

To provide for a controlled wastegate flow, the wastegate port 28 is controlled by a wastegate valve assembly 31 which includes a wastegate valve 32 that seats within the port 28 and is selectively openable and closable during operation of the turbocharger 10.

As seen in FIG. 1, the wastegate valve 32 is shown in the closed position wherein the exhaust gas is routed into the volute 14 through the turbine inlet 23 and this flow is restricted to the volute 14 due to the closed condition of the wastegate valve 32. The valve 32 also is pivotable to the open condition of FIG. 3 wherein exhaust gas now is flowable into the wastegate passage 26. The wastegate valve 32 is operated by an actuator assembly 33 (FIG. 1) which includes an actuator rod 33 that pivots the wastegate valve 32 so as to selectively open and close the wastegate port 28 and thereby control a flow of a portion of the exhaust gas into the wastegate passage 26. Therefore, a controlled portion of exhaust gas may flow through the wastegate passage 26 to the turbine outlet 27, thereby bypassing the turbine 12.

Figure 2:
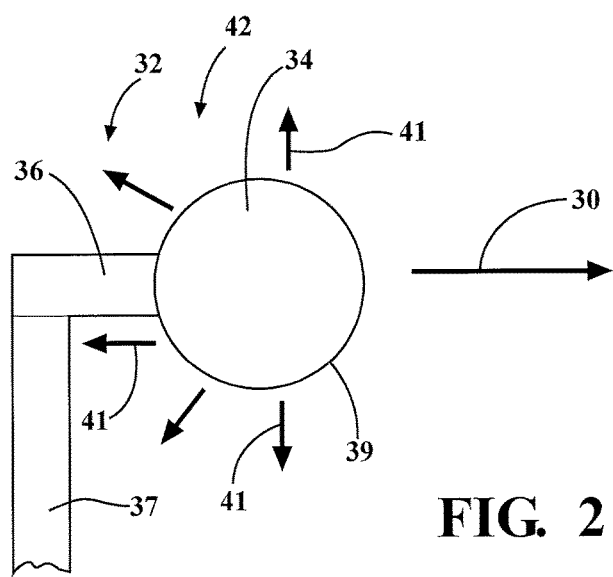
FIG. 2 is a top view of a wastegate valve.

The invention relates to an improved wastegate valve 32 which provides more efficient flow of the exhaust gas through the wastegate port 28 and the wastegate passage 26. More particularly as to the wastegate valve 32 shown in FIGS. 2 and 3, this valve typically includes a disc-like valve body 34 which is supported on a valve arm 36 which in turn is pivotally supported on the turbine housing 14 by a pivot rod 37 so as to open and close the wastegate port 28.

The pivot rod 37 is operated by the actuator assembly 33 so as to pivot the valve body 34 into the wastegate port 28 to a closed first position (FIG. 1) which closes the wastegate port 28, and pivot out of the wastegate port 28 to an open second position (FIGS. 2 and 3) which opens the wastegate port 28.

The valve body 34 has a valve face 38 which faces towards the wastegate port 28 wherein an outer perimeter 39 seats against the wall 25 and covers the port 28 when closed. When in the open position, the valve face 38 faces toward the wastegate port 28 and is canted at an angle A relative to a plane 40 spanning the wastegate port 28. The valve face 38 preferably is oriented so that the valve face 38 angles toward the wastegate passage 26 which serves to redirect the wastegate flow as it passes through the port 28 in direction 29 and turns into the wastegate passage 26 in direction 30.

The direction 30 extending into the wastegate passage 26 is the primary direction toward which all of the wastegate flow needs to be directed. However, in known valve bodies of the wastegate valve 32 as diagrammatically shown in FIGS. 2 and 3, the exhaust gas may spill over the sides of the valve body 34 in non-optimal flow directions 41 transverse to the optimal direction 30 which therefore creates turbulent fluid flow in this general area 42 and requires that this turbulent flow be further redirected by the sides of the wastegate passage 26 in order to redirect the exhaust gas into the wastegate passage 26. This reduces the efficiency of the flow through the wastegate port 28 and can create increased back pressure.

Figure 4:
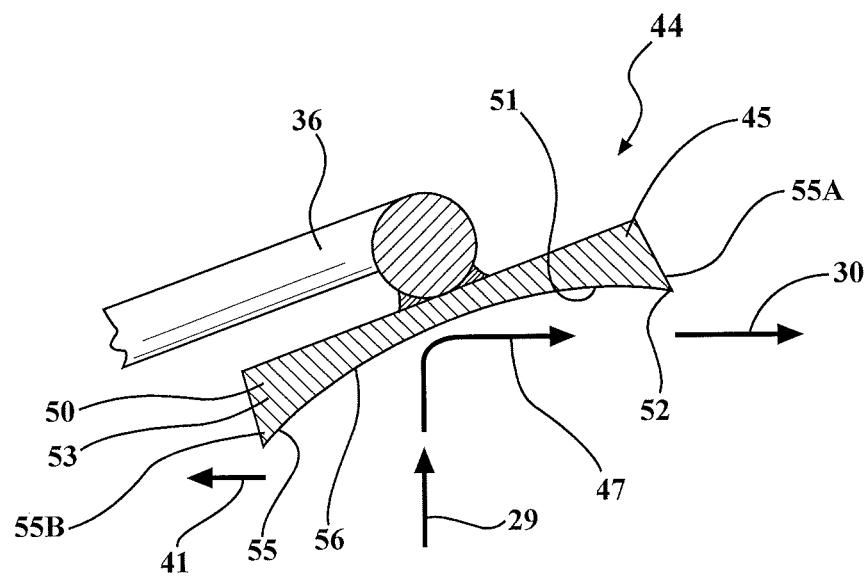
FIG. 4 is a side view of a first embodiment of an improved waste gate valve.

However, as described relative to FIG. 4 and the remaining figures, a valve body 44 of an inventive wastegate valve 45 includes flow formations which serve to reduce the flow of exhaust gas in non-optimal directions 41. These flow formations serve to optimize or maximize the flow of exhaust gas in the optimal or primary flow direction 30 as the exhaust gas flow turns through a turn angle 47 from the inlet direction 29. The wastegate valve 45 and valve body 44 are also identified in FIG. 1 since the general location and appearance are similar to wastegate valve 32 and valve body 34 and are operated the same.

A first embodiment of the valve body 44 is also designated by reference numeral 50 in FIG. 4. This valve body 50 includes a dished valve face 51 which defines a first configuration for a flow formation 52. In this embodiment, the flow formation 52 is defined by a concave shape provided to the valve face 51 wherein a perimeter 53 is provided with a raised edge 55. This concave shape may be a true concave shape wherein raised edge 55 is annular or a closed loop and the valve face 51 curves inwardly about the entire perimeter 53 to a dished center portion 56. The concave shape also may be a modified concave shape wherein the valve face slopes from the leading and trailing edge portions 55A and 55B of the valve face 51 to the center portion 56 thereof while the sides possibly could have less or no concavity. The term concave will also be understood to apply to an inclined flat surface that does not have any curvature from the periphery to the center of the valve face.

When the valve body 50 is canted in the open position shown, the valve face 51 is oriented almost horizontal at the leading edge 55A, which facilitates fluid flow in this direction, and is more vertical near the trailing edge 55B, which impedes fluid flow in this direction. Therefore, the fluid flow will tend to flow towards the optimal flow direction 30.

Figure 5:
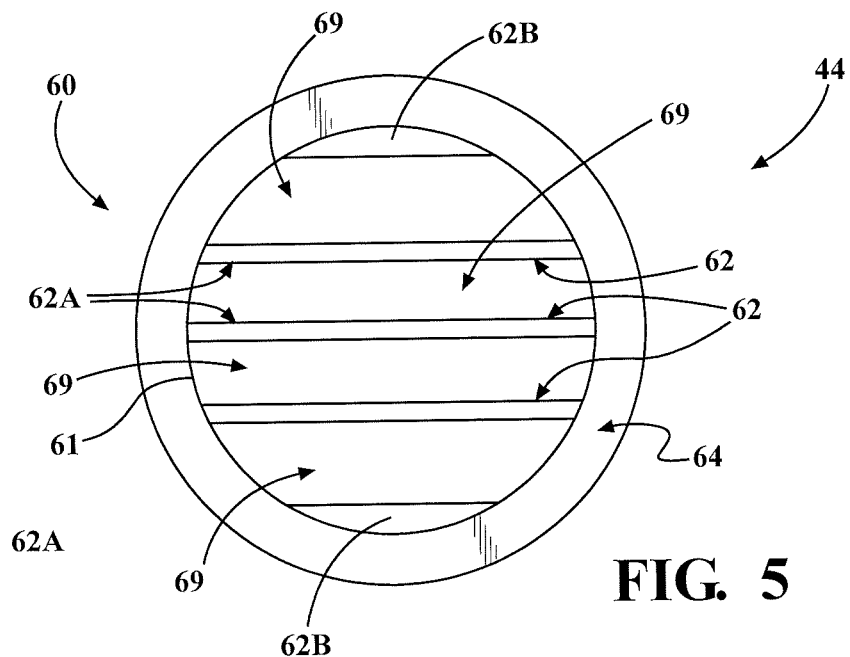
FIG. 5 is a bottom view of a second embodiment of the waste gate valve.
Figure 6:
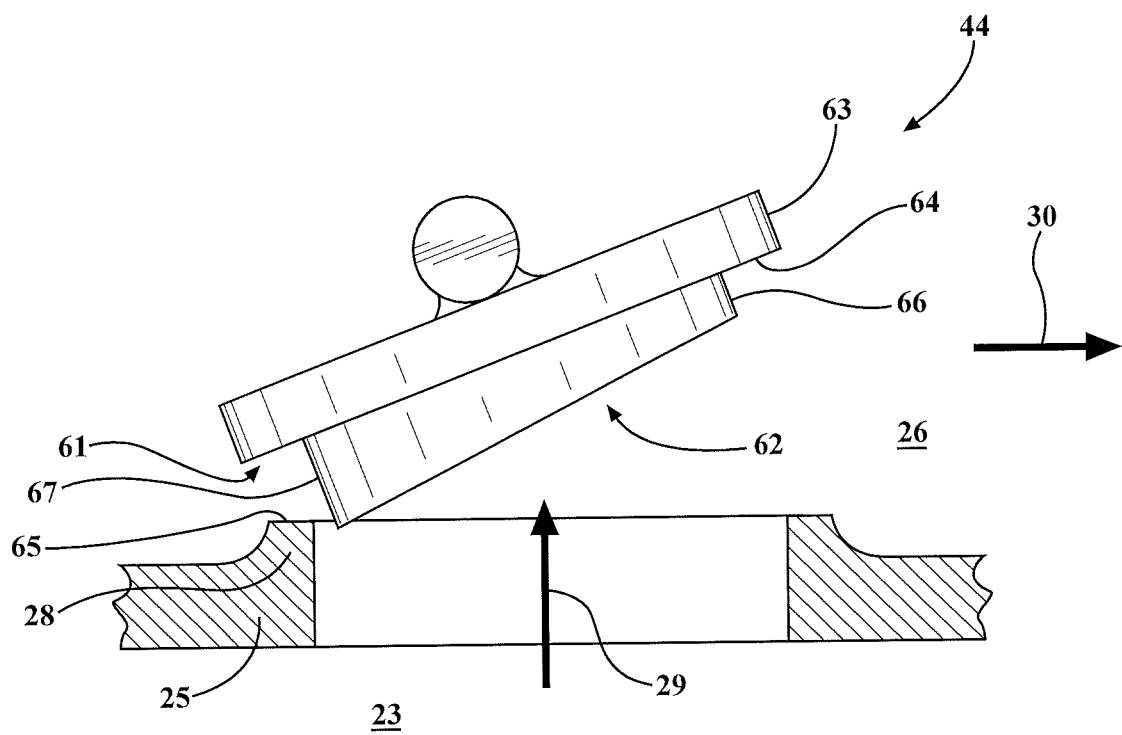
FIG. 6 is a side view thereof.

In a second embodiment of the valve body 44 as seen in FIGS. 5 and 6, the valve body 44 is also designated by reference numeral 60. This valve body 60 includes a valve face 61 which is provided with shallow ribs or strakes 62 which extend parallel to the flow direction 30 and serve to direct optimal flow in the primary direction 30. A perimeter 63 of the valve body 60 defines an annular, flat sealing surface 64 which is configured to surround the port 28 and abut against an annular rim 65 defining this port 28. The strakes 62 project downwardly below the sealing surface 64 and may be inclined in the flow direction as seen in FIG. 6. Leading edges 66 of the strakes 62 may be shorter than trailing edges 67 which further encourages flow toward direction 30.

The strakes 62 may comprise intermediate strakes 62A that may be formed longer in the lengthwise direction and thinner in the widthwise direction in comparison to end strakes 62B. These strakes 62 define flow channels 69 which extend generally in the direction 30. The bottom surfaces of these channels 69 are canted or inclined when the valve body 60 is in the open position so as to face toward the wastegate passage 26 which thereby redirects or turns the fluid flow and encourages exhaust gas flow in this direction 30.

The strakes 62 can be designed to optimize the fluid flow. Thus, the number of strakes 62 and channels 69 can be varied as well as the relative heights and depths thereof, as well as their widths. The widths for each can be the same or may vary from each other.

Figure 7:
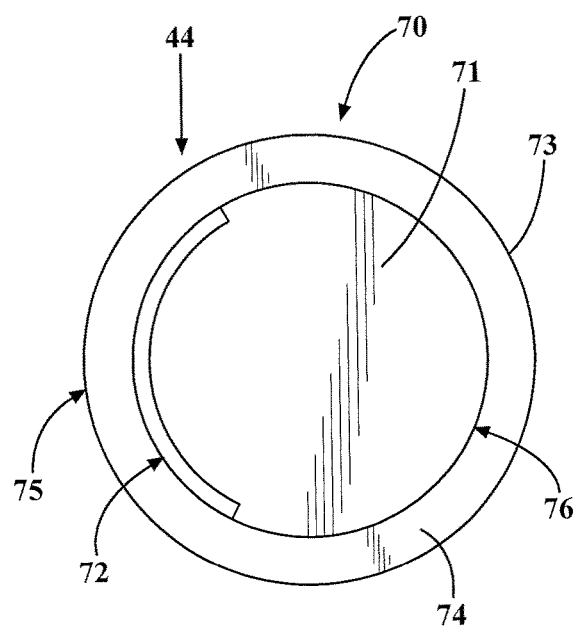
FIG. 7 is a bottom view of a third embodiment of the waste gate valve.
Figure 8:
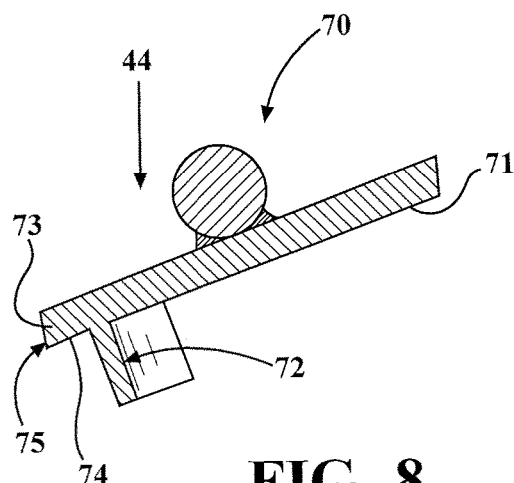
FIG. 8 is a side view thereof.

In a third embodiment shown in FIGS. 7 and 8, the valve body 44 is also designated by reference numeral 70. This valve body 70 includes a valve face 71 wherein the flow formation may be a dam 72 that rises from the valve face 71 along a portion of a face perimeter 73.

More particularly, the perimeter 73 of the valve body 70 defines an annular, flat sealing surface 74 which is configured to surround the port 28 and abut against the annular rim 65 defining this port 28 as shown in FIG. 6. The flow control dam 72 (FIGS. 7 and 8) projects downwardly below the sealing surface 74 and is spaced radially inwardly of the perimeter 73 so as to define the sealing surface 74. The dam 72 has an arcuate shape when viewed from below and serves to impede flow from a trailing edge 75 and encourage flow toward a leading edge 76. In the alternative, the dam 72 of FIGS. 7 and 8 could be provided on the leading edge 76. While the dam 72 is continuous and unbroken, the dam 72 could also be slotted to help direct and regulate gas flow.

Figure 9:
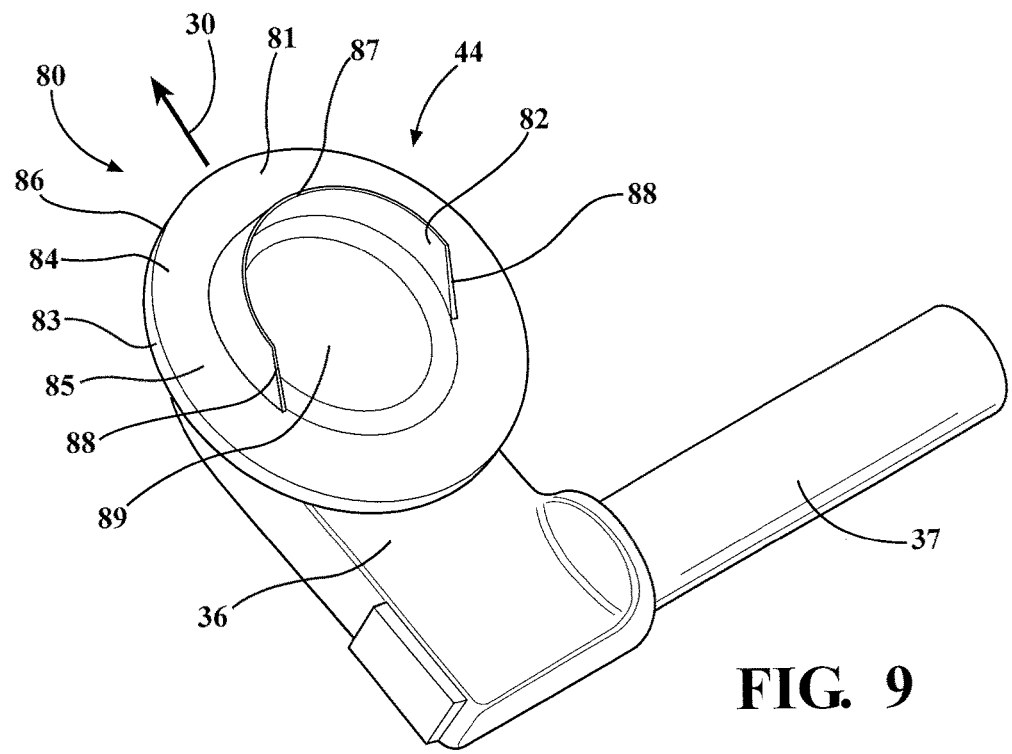
FIG. 9 is a pictorial view of a fourth embodiment of the waste gate valve.

Referring to FIG. 9, a preferred, fourth embodiment is illustrated. The valve body 44 is also designated by reference numeral 80. This valve body 80 includes a valve face 81 wherein the flow formation may be a semicircular or arcuate dam 82 that rises from the valve face 81 along a portion of a face perimeter 83.

The perimeter 83 defines an annular, flat sealing surface 84. The flow control dam 82 projects downwardly below the sealing surface 84 and is spaced radially inwardly of the perimeter 83 to define an annular sealing surface 85 like sealing surface 74. The dam 82 has an arcuate shape extending approximately 180 degrees about the circumference of the perimeter 83 and serves to direct fluid flow which actually improves flow in direction 30 over a leading edge 86.

More particularly, the dam 82 has a generally flat, arcuate top edge 87 that has a length that extends about 180 degrees and defines a uniform or constant height along the length of the dam 82. The opposite ends of the top edge 87 terminate at sloped edges 88 which extend a short distance and taper down to the surface 84. While the dam 82 is continuous and unbroken, the dam 82 could also be slotted to help direct and regulate gas flow. For example, the dam 82 may be notched, such as with a V-notch wherein the dam 82 is similar to a V-notch weir or a combination weir. As such, the top dam edge 87 may have a variable height along the length of the dam 82, which height can be varied due to the formation of the slots or notches or due to more arcuate contours formed in the edge 87. In this manner, the flow rate and flow direction of the exhaust gas may be regulated and controlled by the dam 82.

Figure 10:
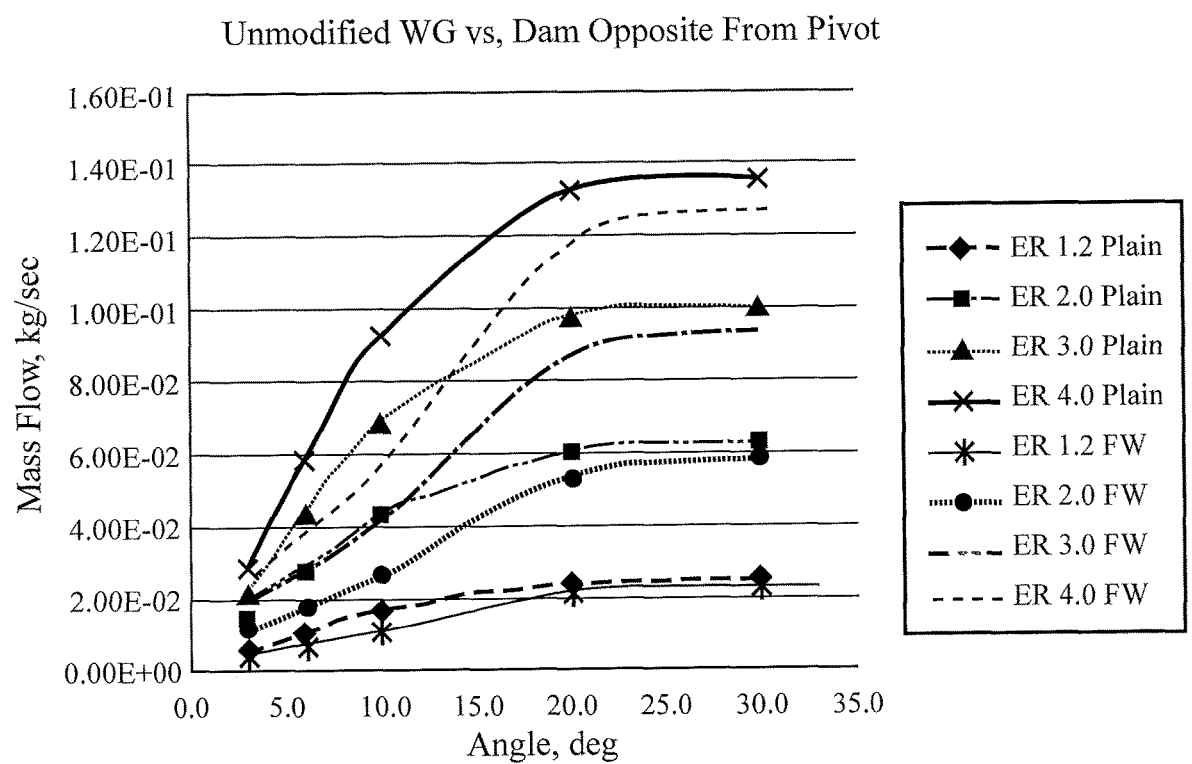
FIG. 10 is graph showing a comparison of mass flow between an unmodified waste gate and the inventive waste gate valve of FIG. 9.

The above flow formations such as the dam 82 serve to direct or regulate the gas flow in the preferred direction of flow 30. In support, FIG. 10 is a graph showing the performance of different gate valve shapes. The curves designated as "plain" are for a conventional waste gate design which has not been modified according to the invention. The inventive waste gate valve body 80 of FIG. 9 is indicated on the graph of FIG. 10 by solid lines which indentify a front wall design (FW) or in other words, a design where the dam 82 is located on the front side opposite to the pivot side of the valve body 80 defined by the shaft 37.

FIG. 10 compares the mass flow versus the variable valve angle defined by the valve face 81 which varies as the valve body 80 and its valve face 81 pivots open and closed. The mass flow and valve angle are further compared relative to different expansion ratios (ER) for the turbocharger. As can be seen, the mass flow follows a more linear increase as the valve angle increases in comparison to the plain graph line which shows a more curved incline. The FW design of valve body 80 allows the valve designer to more precisely control the mass flow at valve angles up to about 20 degrees since the mass flow increases relatively linearly with respect to the valve angle. After the valve face 81 reaches the 20 degree valve angle, the mass flow regulation deviates from the roughly linear control. This valve performance is believed to be due to the improved flow control of the exhaust gas in primary direction 30 wherein flow in secondary directions is reduced. The design of FIGS. 9 and 10 therefore provides a further improvement over the design of FIGS. 7 and 8.

As can be seen from the above disclosure, the various configurations of these flow formations serve to optimize flow in the primary direction 30 and reduce non-optimal flow in secondary directions 41 transverse to the primary direction 30.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A wastegate valve assembly (31) for a turbocharger (10) having a wastegate passage (26) which extends in a first flow direction (30), and a wastegate port (28) which opens into said wastegate passage (26) to divert a portion of exhaust gas flow to said wastegate passage (26) wherein said wastegate port (28) defines a second flow direction (29) that is transverse to said first flow direction (30), said wastegate valve assembly (31) comprising:

a valve body (44) that is seatable with the wastegate port (28) and is selectively openable and closable, said valve body (44) having a valve face (51), (61), (71), (81) which faces towards the wastegate port (28) and when said valve body (44) is in the open position, said valve face (51), (61), (71), (81) is canted at an angle so that said valve body (44) angles toward said wastegate passage (26), said valve body (44) serving to redirect wastegate exhaust flow passing through said wastegate port (28) in said second direction (29) by turning wastegate exhaust flow through a turn angle (47) into said wastegate passage (26) extending in said second direction (30); and wherein said valve body (44) comprises a valve face having at least three strakes extending parallel to each other and to the direction direct, the valve face having an annular, flat seating surface constructed and arranged to surround the wastegate port, and wherein the at least three strakes each extend from the annular, flat sealing surface on one side of the valve face to the annular, flat sealing surface another, opposite side of the valve face, wherein each of the at least three strakes are shorter at that leading edge of the valve than at the trailing edge of the valve.

2. The turbocharger according to claim 1, wherein said turn angle (47) between said first and second flow directions is 90 degrees.

3. The turbocharger according to claim 1, wherein said valve body (44) is pivotable from a closed position to a canted angle in said open position.

4. A turbocharger (10) comprising:

a turbine (11) having a volute (14) and a turbine inlet (23) which is supplied with an exhaust gas flow in an inlet flow direction, said turbine (11) having an intermediate wall (25) defining a wastegate passage (26) which extends in a first flow direction (30), and a wastegate port (28) which opens into said wastegate passage (26) to divert a portion of exhaust gas flow from said turbine inlet (23) to said wastegate passage (26) wherein said wastegate port (28) defines a second flow direction (29) for diverted exhaust gas that is transverse to said first flow direction (30), and wherein the inlet flow direction and the first flow direction are in the same direction;

said turbine further including a wastegate valve assembly (31) to provide for a controlled exhaust gas flow through said waste gate port (28), said wastegate valve assembly (31) including a valve body (44) that seats with said wastegate port (28) and is selectively openable and closable, said valve body (44) having a valve face (51), (61), (71), (81) which faces towards said wastegate port (28) and when said valve body (44) is in the open position, said valve face (51), (61), (71), (81) is canted at an angle so that said valve face (51), (61), (71), (81) angles toward the wastegate passage (26) which serves to redirect wastegate exhaust flow passing through said wastegate port (28) in said second direction (29) by turning wastegate exhaust flow through a turn angle (47) into the wastegate passage (26) extending in said second direction (30); and wherein said valve body (44) comprises a dam that extends into the wastegate port (28) when the valve is seated, the dam (72) having an arcuate shape and being disposed on a trailing edge (75) of the valve face and constructed and arranged to impede flow from the trailing edge (75) and encourage flow toward a leading edge (76) of the valve face, wherein the dam has an arcuate top edge of a constant height and wherein opposite ends of the arcuate top edge terminate at sloped edges attached thereto.

* * * * *